C. A. TILLY.
FAUCET.
APPLICATION FILED OCT. 14, 1908.
967,861.
Patented Aug. 16, 1910.
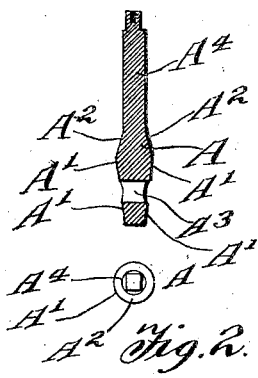
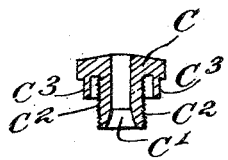
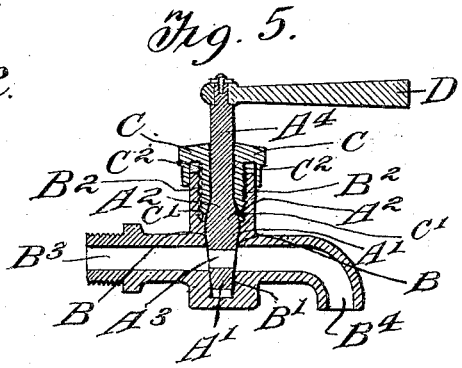
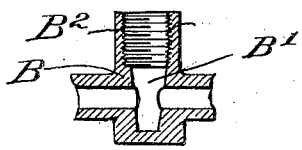
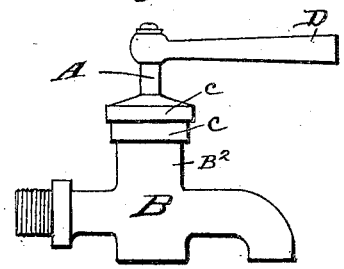
WITNESSES:
F. C. Gibson
C. Bradway.
Charles A. Tilly. INVENTOR.
BY Victor J. Evans
ATTORNEY.
THE NORRIS PETERS CO., WASHINGTON, D. C.

UNITED STATES PATENT OFFICE.

CHARLES A. TILLY, OF BROOKLYN, NEW YORK.

FAUCET.

967,861.  Specification of Letters Patent.  Patented Aug. 16, 1910.

Application filed October 14, 1908. Serial No. 457,680.

*To all whom it may concern:*

Be it known that I, CHARLES A. TILLY, a citizen of the United States, residing at Brooklyn, in the county of Kings and State of New York, have invented new and useful Improvements in Faucets, of which the following is a specification.

This invention relates to faucets so designed as to dispense with rubber, leather or other packings around the valve stem.

The invention has for one of its objects to improve and simplify the construction of devices of this character so as to be comparatively simple and inexpensive to manufacture, and reliable and efficient in use.

Another object of the invention is the provision of a faucet in which the valve is provided with a taper against which the cap nut is adapted to bear, the nut being formed with a conical seat whereby a water-tight joint is provided.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one embodiment of the invention, Figure 1 is a vertical section of the valve. Fig. 2 is a plan view thereof. Fig. 3 is a vertical section of the cap nut. Fig. 4 is a plan view thereof. Fig. 5 is a vertical section of the faucet. Fig. 6 is a fragmentary sectional view of the casing or body of the faucet. Fig. 7 is a side elevation of the faucet.

Similar reference characters are employed to designate corresponding parts throughout the views.

Referring to the drawing, $A^1$ designates the valve which is tapered and ground to fit a correspondingly-shaped seat $B^1$ of the casing or body B of the faucet and above the downwardly tapered portion of the valve is an upwardly-tapering portion $A^2$ which is gradually ground to fit a conical seat $C^1$ of the cap nut C, said seat being also carefully ground so that a water-tight joint can be obtained. Above the taper $A^2$ is a stem $A^4$ which projects through the cap nut C and is provided with a removable handle D. The valve has a port $A^3$ which is adapted to register with the passages $B^3$ and $B^4$ of the faucet. The valve casing B is formed with a tubular neck portion $B^2$ which is internally threaded to receive the tubular portion $C^1$ of the nut $C^2$, the said tubular portion being externally threaded to screw into the neck $B^2$. The seat $C^1$ is provided in the tubular portion of the cap nut so that when the cap nut is screwed home, the said seat will tightly engage the taper $A^2$ of the valve. On the cap nut is a cylindrical flange $C^3$ which fits over and around the neck $B^2$ of the casing B.

Having thus described the invention, what I claim is:—

A faucet comprising a casing having inlet and outlet passages arranged in alinement and provided with an integrally formed tapering valve seat extending across the passages at a point between them, a tubular neck extension disposed in line with the seat and having its bore adjacent the inlet and outlet passages tapered, a ported plug valve having a tapering body adapted to tightly engage the wall provided by the tapering valve seat and the tapering portion of the neck, a stem connected with the said tapered portion, a cap nut having a tubular member engaging in the said neck extension and also provided with a cylindrical flange arranged concentric around said tubular member and spaced therefrom for engaging the outside of the neck extension, the central tubular member of the cap nut having the lower portion of its bore tapered and adapted to bear upon the upper portion of the tapered valve to form a water-tight joint, and means for revolving the ported plug valve.

In testimony whereof I affix my signature in presence of two witnesses.

CHARLES A. TILLY.

Witnesses:
 WALTER A. SMITH,
 COURTNEY W. TOLLEY.